United States Patent
Naljotov et al.

(10) Patent No.: US 6,632,069 B1
(45) Date of Patent: Oct. 14, 2003

(54) STEP OF PRESSURE OF THE STEAM AND GAS TURBINE WITH UNIVERSAL BELT

(76) Inventors: Oleg Naljotov, 1975 84 St. AP#B4, Brooklyn, NY (US) 11214; Vladlen Zitin, 1975 84 St. AP#B4, Brooklyn, NY (US) 11214

( * ) Notice: Subject to any disclaimer, the term of this patent is extended or adjusted under 35 U.S.C. 154(b) by 119 days.

(21) Appl. No.: 09/650,269

(22) Filed: Oct. 2, 2001

(51) Int. Cl.[7] .............................................. F01D 11/02
(52) U.S. Cl. ..................................... 415/173.5; 416/92
(58) Field of Search ........................... 415/173.6, 173.5, 415/173.4, 174.5; 416/92

(56) References Cited

U.S. PATENT DOCUMENTS

| | | | | |
|---|---|---|---|---|
| 3,575,523 A | * | 4/1971 | Gross, Jr. ................ | 415/173.5 |
| 3,867,060 A | * | 2/1975 | Huber ..................... | 415/173.5 |
| 4,534,701 A | * | 8/1985 | Wisser .................... | 415/173.6 |
| 5,088,889 A | * | 2/1992 | Wolff ...................... | 415/171.1 |
| 5,154,581 A | * | 10/1992 | Borufka et al. .......... | 415/173.6 |
| 5,224,713 A | * | 7/1993 | Pope ....................... | 415/174.5 |
| 5,232,338 A | * | 8/1993 | Vincent de Paul et al. ... | 416/92 |
| 6,062,813 A | * | 5/2000 | Halliwell et al. ........ | 415/173.6 |
| 6,142,739 A | * | 11/2000 | Harvey .................... | 415/173.5 |
| 6,340,284 B1 | * | 1/2002 | Beeck et al. .................. | 416/92 |

* cited by examiner

Primary Examiner—Edward K. Look
Assistant Examiner—Igor Kershteyn

(57) ABSTRACT

Imperfect design of shroud or identical parts of the blades of steam/gas turbines, including the adjoining seals, leads to the decrease in reliability and efficiency. These drawbacks are eliminated by way of drilling of radial holes in the shroud of the blades. The transfer of steam through the shroud holes results in the relief of the pressures gradient on the surface of the shroud and prevents the formation of metal oxide, salt and other deposits on the inner surfaces of the shroud. The quantity and diameter of the holes, as well as their corresponding disposition and the values of radial clearances in shroud crowning seals regulate their efficiency.

1 Claim, 6 Drawing Sheets

STEP OF PRESSURE OF THE STEAM AND GAS TURBINE WITH UNIVERSAL BELT

FIELD OF THE INVENTION

The invention refers to the manufacture and operation of steam and gas turbines, compressed air plants and gas force pumps.

Imperfect design of belt shrouds or identical parts of the blades of such machines, including the adjoining seals, leads to the decrease in reliability and efficiency.

1. Uneven distribution of radial clearances along the shrouds' circumference induces the effect of airdynamic Thomas forces, decreasing vibration behavior.
2. The inner surface of shrouds is subjected to formation of metal oxide and salt deposits.

These drawbacks are eliminated by way of drilling of radial holes in the shrouds of the blades. The transfer of steam through the shroud holes results in the relief of the pressures gradient on the surface of the shroud and prevents the formation of metal oxide, salt and other deposits on the inner surfaces of the shrouds.

The quantity and diameter of the holes, as well as their corresponding disposition and the values of radial clearances in shroud crowning seals regulate their efficiency.

BACKGROUND AND PRIOR ART

The invention relates to the field of turbine and air compressor construction, more precisely to steam turbines as well as gas turbines and air compressor pressure stages, incorporating sealed shroud on turbine rotor blades, said seals located on shroud or incorporated in turbine stator. The invention can be used in the development of steam turbines at turbine manufacturing plants, as well as in enhancement of steam and gas turbines at heat power stations and that of aircraft engines with gas turbines and compressors.

Known are steam turbine pressure stages designs (FIG. 1 and FIG. 2) with nozzle (directional) block 1 with nozzle (directional) blades 2 and shield 3, a rotor wheel, consisting of disc 6, rotor blades 7, a shroud 8 and shroud seals 4 and 5, incorporated in the shield 3 of the nozzle block FIG. 1 or FIG. 2 or located on the shroud of rotor blades FIG. 2.

Shroud seals of a turbine stage consist as a rule of two ridges, with the first ridge 4 following the direction of steam flow located in the seal and the second ridge 5, both of which form a shroud chamber 11, located over the shroud, comprising radial clearances h1 and h2, determining the flow rate of steam, coming through seal.

Clearances h1 and h2 are set equal in absolute value for each stage or stage group, said value depending on the conditions of thermal expansion of turbine parts, as well as on the conditions of turbo-unit threshold power, i.e. power, producing low frequency vibration.

Rotor blade shroud 8, with layouts represented on FIG. 3 and FIG. 4 are in the form of a strip with openings 15 for rotor blade pins 9, which are unriveted after their mounting on rotor blades, forming a pack of six or more blades. Parts 13 of these shroud, covering single flow channel do not have any openings.

Steam or gas turbine stages described FIG. 1 and FIG. 2 possesses the following significant flaws, revealed in the course of turbine operation:

a) Due to the uneven distribution of clearances in shroud seals around the stage, there emerge air dynamic shroud and ridge Thomas forces, inducing unstable operation of turbine rotor and its supports;

b) Inner surface 8 of rotor blade shroud is subject to the formation of metal and salt oxides 10, the presence of which closes a portion of rotor blade open flow area, which leads to the decrease of rated efficiency factor with subsequent reduction of turbine power.

c) Excessive fuel combustion, owing to p. b) with varying comparative turbine loads leads to the extra consumption of fuel resources.

SUMMARY OF THE INVENTION

The purpose of the invention is the improvement of steam and gas turbines operation reliability, the increase of actual efficiency factor and power as compared to the existing parameters.

The abovementioned purpose is achieved by way of making of clearances h1 and h2 in the ridges of shroud seals in such a manner, that the radial seal h2 on the second ridge 5 is smaller than the radial clearance hi on the first ridge 4, which permits to regulate the flow rate of steam, coming through shroud chamber 11 within specified limits. A system of discharge openings 12 is implemented in rotor blade shroud parts 13, covering single inter-blade channel, by way of drilling of the shroud FIG. 5 and FIG. 6. The openings are located evenly along the surface of parts 13 and 14 of the shroud 8, following the direction of steam flow 18 FIG. 4 in inter-blade channel 14. Said openings may be organized in staggered order 16, depending on the properties of deposits and their volume, as well as on seals design.

The ratio between the number of openings n and their diameter d is the following:

$$d = 2 \cdot \sqrt{\frac{(0,02 \div 0,50) \cdot Sk}{n \cdot \pi}}$$

Where Sk is the area of the shroud's part covering each single inter-blade channel in rotor wheel.

Due to openings 12 in the shroud 8 of rotor blades 7 there occurs in the course of turbine operation a steam overflow from the chamber 11 located above the shroud and enclosure 17, also above the shroud FIG. 5 to the part of flow channel, located under the shroud, which leads to the creation of an obstacle effect, preventing the formation of metal and salt oxides on the inner surface of the shroud.

The discharge of pressure from the chamber 11 located over the shroud and enclosure 17 over the shrouds is implemented by similar process of steam overflow, which process excludes the onset of air dynamic above shroud and ridge Thomas forces, inducing unstable operation of turbine rotor and its supports. This, in turn, facilitates the reduction of radial clearance h2 on the second ridge 5, controlling the turbo-unit threshold power, which results in additional increase of the efficiency factor owing to the reduction of steam overflow over the seal.

Thus, the invention can be used for the following purposes:

a) as means, preventing the formation of metal and salt oxides on the inner surfaces of rotor blade shrouds;

b) as means for the enhancement of turbo-unit vibration state c) with the purpose of prolongation of period between repairs owing to p.p. a) and b) and that of turbine service life.

DETAILED DESCRIPTION OF THE INVENTION

Figure 1:
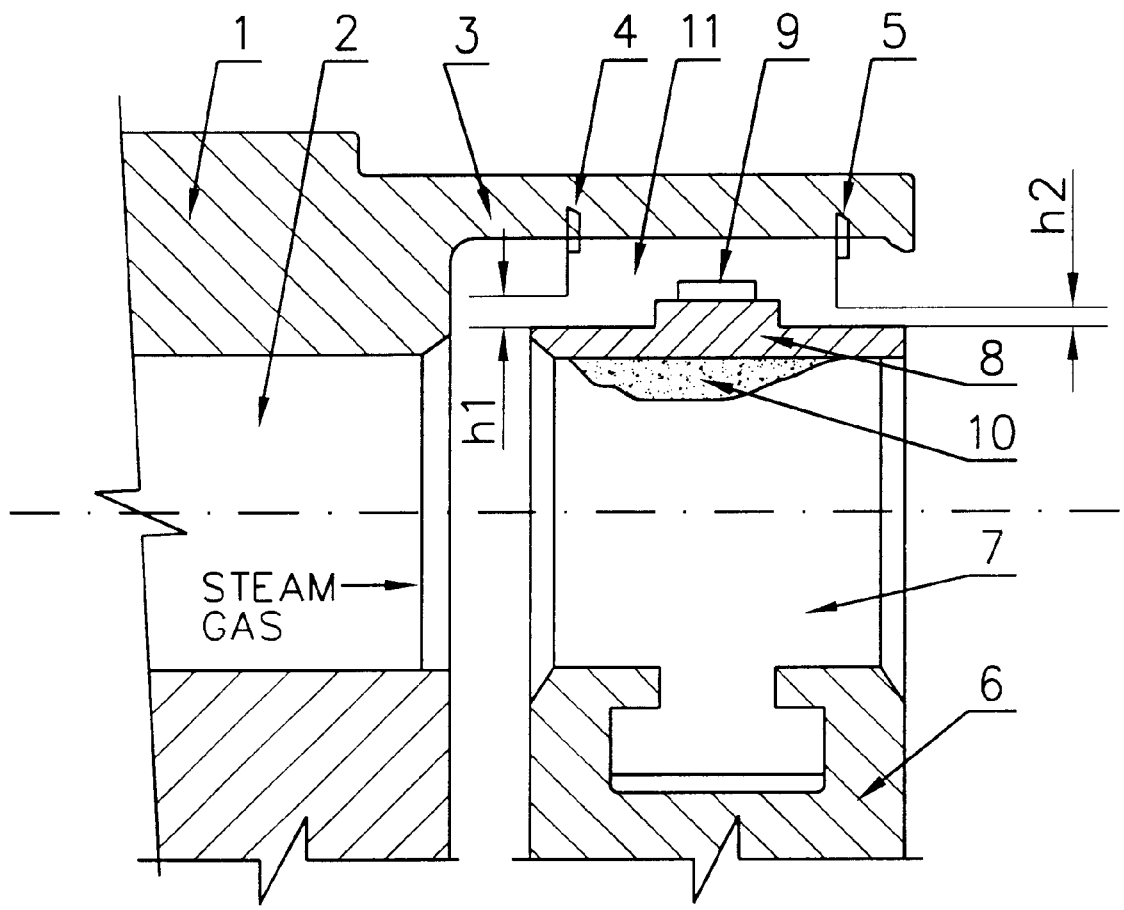
FIG. 1 is a longitudinal section of the turbine pressure stage with shroud seals in the nozzle block shield.
Figure 2:
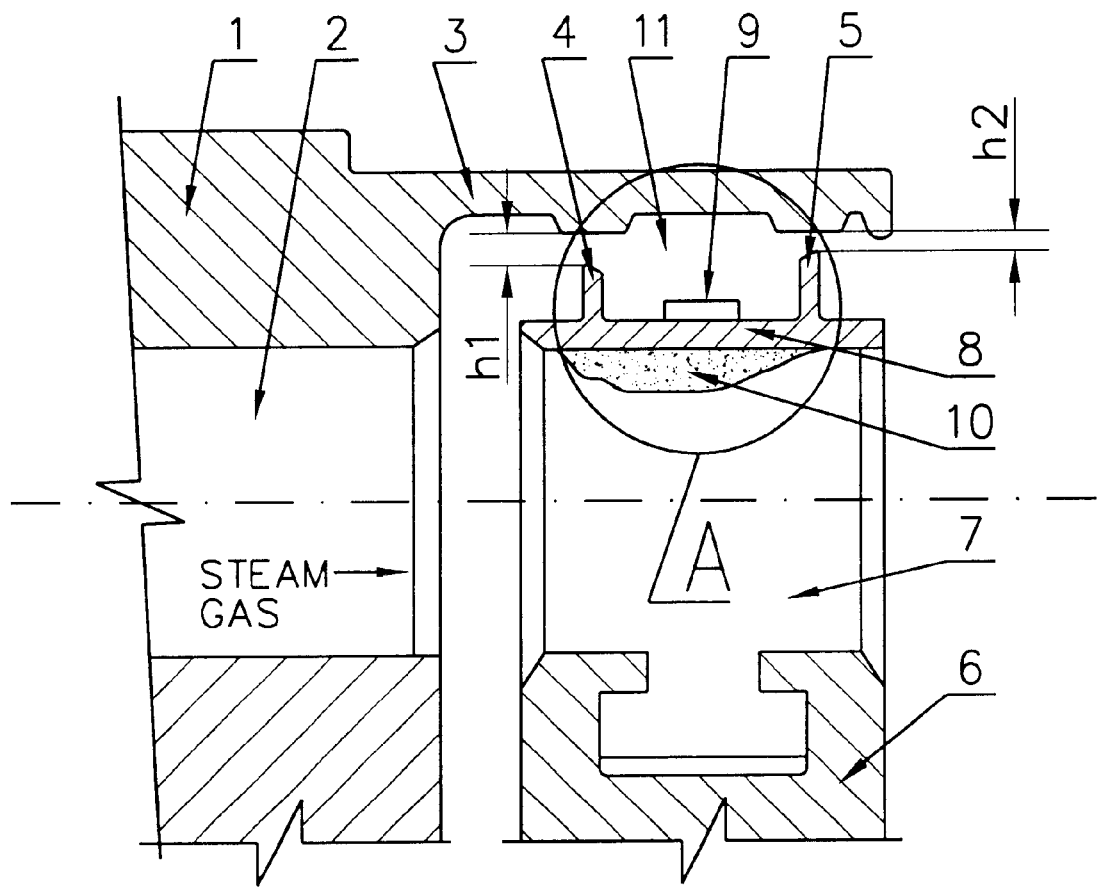
FIG. 2 is a longitudinal section of the turbine pressure stage with shroud seals, located in rotor blade shrouds.
Figure 3:
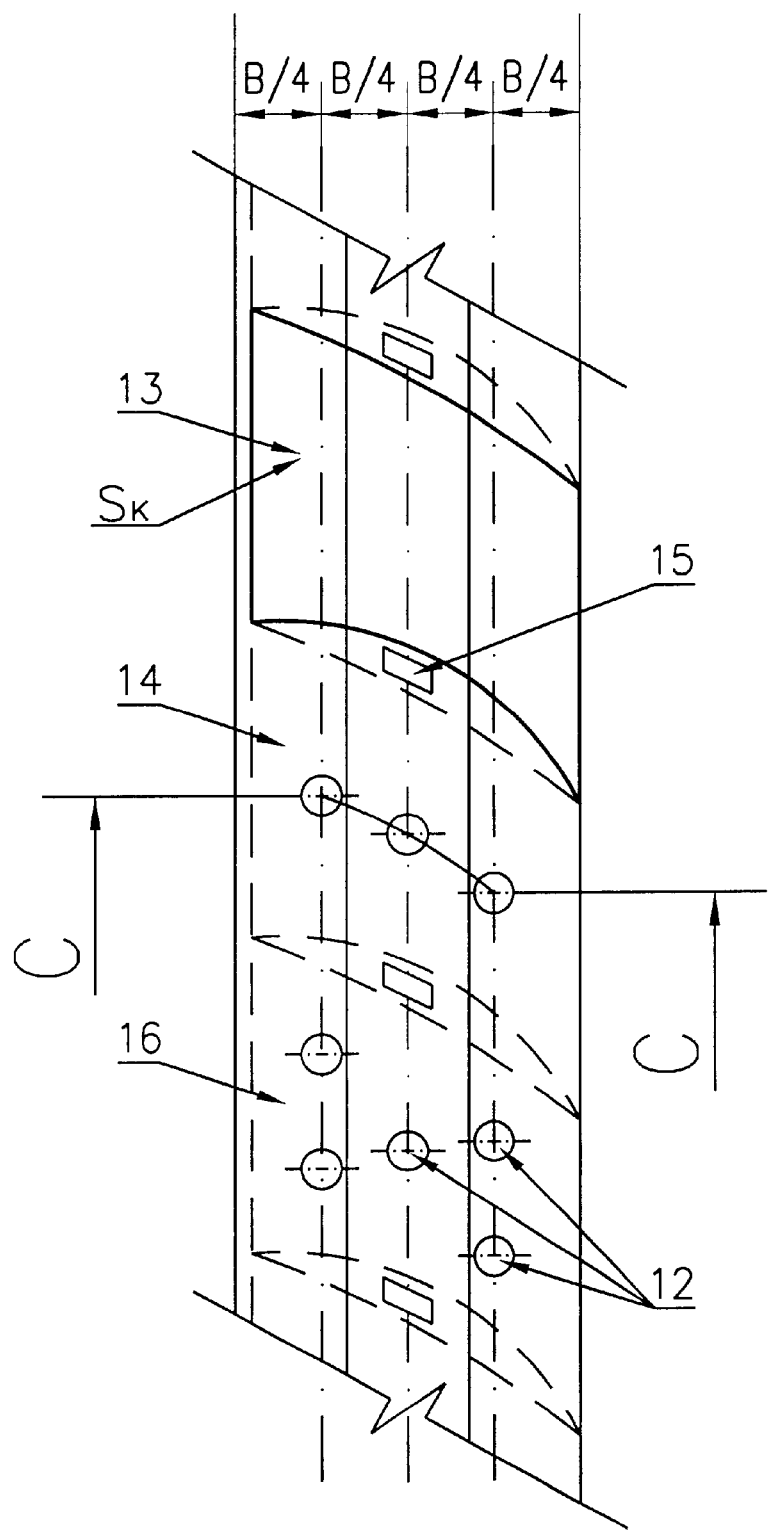
FIG. 3 is a shroud section of FIG. 1.
Figure 4:
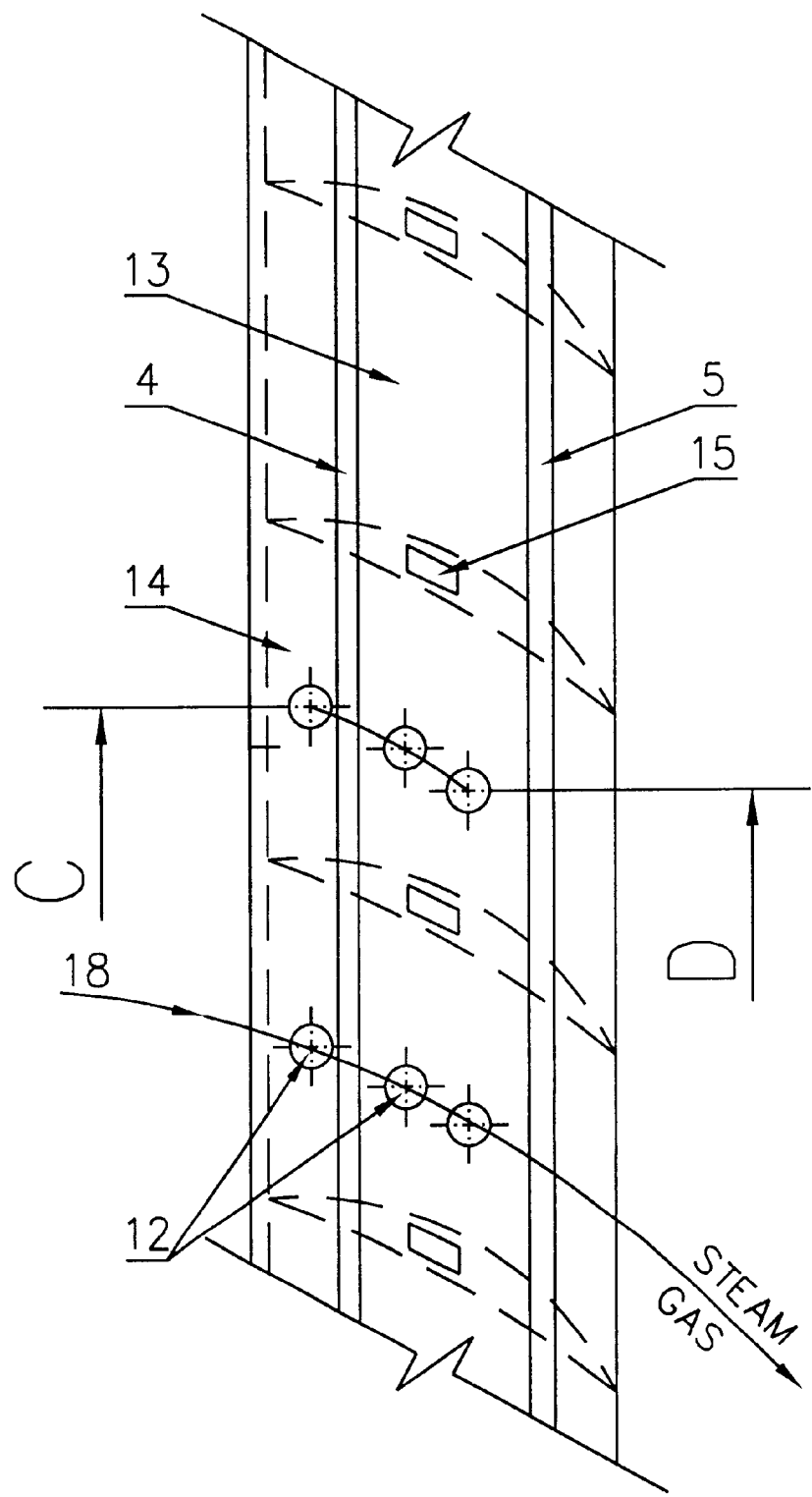
FIG. 4 is a shroud section of FIG. 2.
Figure 5:
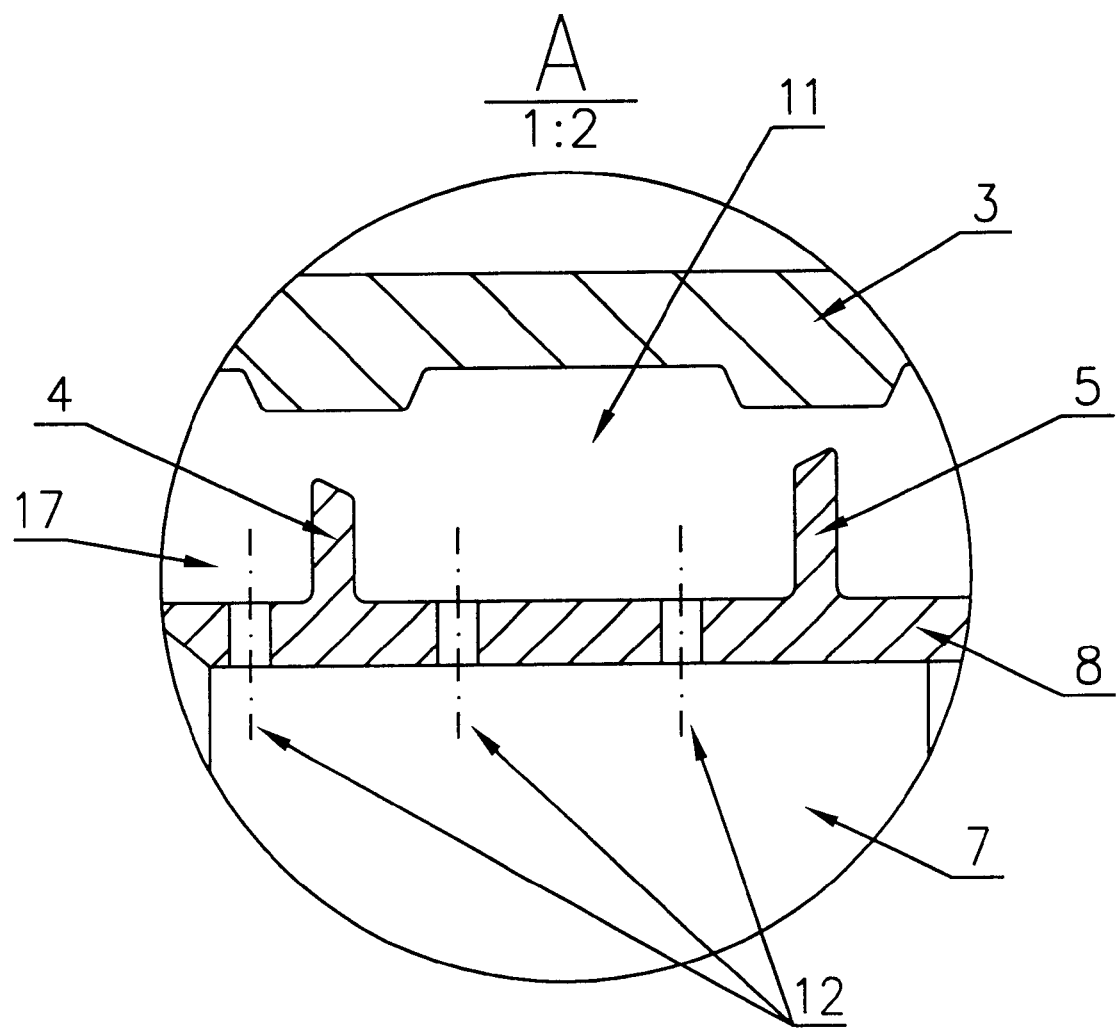
FIG. 5 is a detail of a FIG. 2
Figure 6:
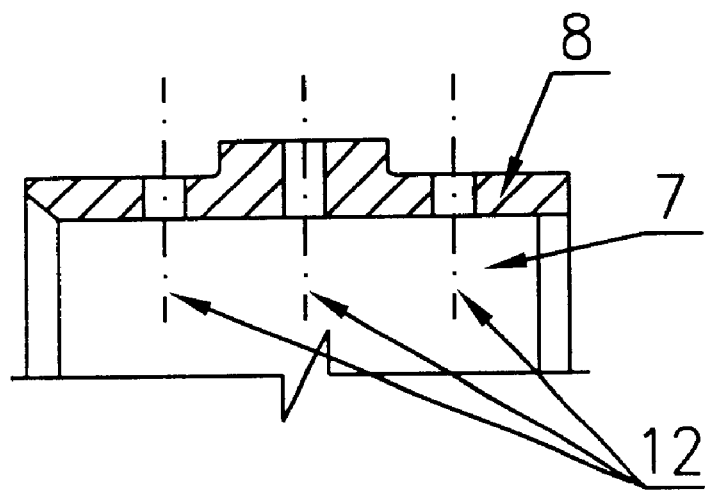
FIG. 6 is a detail of FIG. 1 with section along C—C

A steam (gas) turbine (compressor) pressure stage FIG. 1 and FIG. 2. comprising a nozzle (directional) block 1 with nozzle (directional) blades 2 and a shield 3, seal shroud ridges 4 and 5 or ridges 4 and 5, located on the shroud 8 FIG. 2 and rotor wheel with shroud 8, located on rotor blades 7 differs in the respect, that with the purpose of increasing the efficiency factor and operational reliability of turbine, radial clearance h2 of the second ridge 5 of shroud seal, located along the steam/gas flow is made less than radial clearance h1 of the ridge 4 of the shroud seal and in parts 13, 14, 15 of the shroud 8, closing the single inter-blade channel there is a system of radial discharge openings 12 FIG. 3, FIG. 4, FIG. 5 and FIG. 6, distributed evenly in relation to the surfaces of parts 13, 14, 16 of shroud 8. Said radial discharge openings can also be organized in staggered order 16, as well as along medium steam flow line 14 and 18, or in symmetrical position to steam flow line 18 FIG. 4 in the inter-blade channel, for steam (gas) overflow from the enclosure 17 above the shroud FIG. 5 and chamber 11 above the shroud to the flow channel and the discharge of above shroud pressure, said pressure being the source of air dynamic above shroud and ridge "Thomas forces", which induce unstable operation of turbine rotor and its supports, whereas steam (gas), entering through the discharge openings 12 in shroud 8 to the above shroud enclosure of the flow channel prevents the formation of metal and salt oxides 10 on the inner surface of shroud 8 with the diameter d of the openings 12 and their number n on each surface Sk of each flow channel of shroud parts 13, 14, 16, covering the single inter-blade channel stand in the following ratio:

$$d = 2 \cdot \sqrt{\frac{(0,02 \div 0,50) \cdot Sk}{n \cdot \pi}}$$

What is claimed is:

1. An axial flow fluid machine for use with steam or gas comprising:

a stationary housing, a rotor member having an inner disc, an outer shroud, and a plurality of blades mounted between said disc and said shroud, shroud seals including two sealing combs located either on the outer surface of said outer shroud or on the inner surface of the stationary housing radially facing said outer shroud, said two sealing combs providing two radial clearances h1 and h2 between said rotor member and said housing, said clearance h2 being less than said clearance h1, and a plurality of radial discharge openings arranged in said outer shroud, said openings being distributed either evenly or staggered such that steam or gas flowing radially outwardly through said openings prevents the formation of metal and salt oxides on the inner surface of said outer shroud and wherein the diameter d of said openings, the number n of said openings, and the surface area Sk of the outer shroud covering the flow channel through the rotor satisfies the relationship:

$$d = 2 \cdot \sqrt{\frac{(0,02 \div 0.50) \cdot Sk}{n \cdot \pi}}.$$

* * * * *